UNITED STATES PATENT OFFICE.

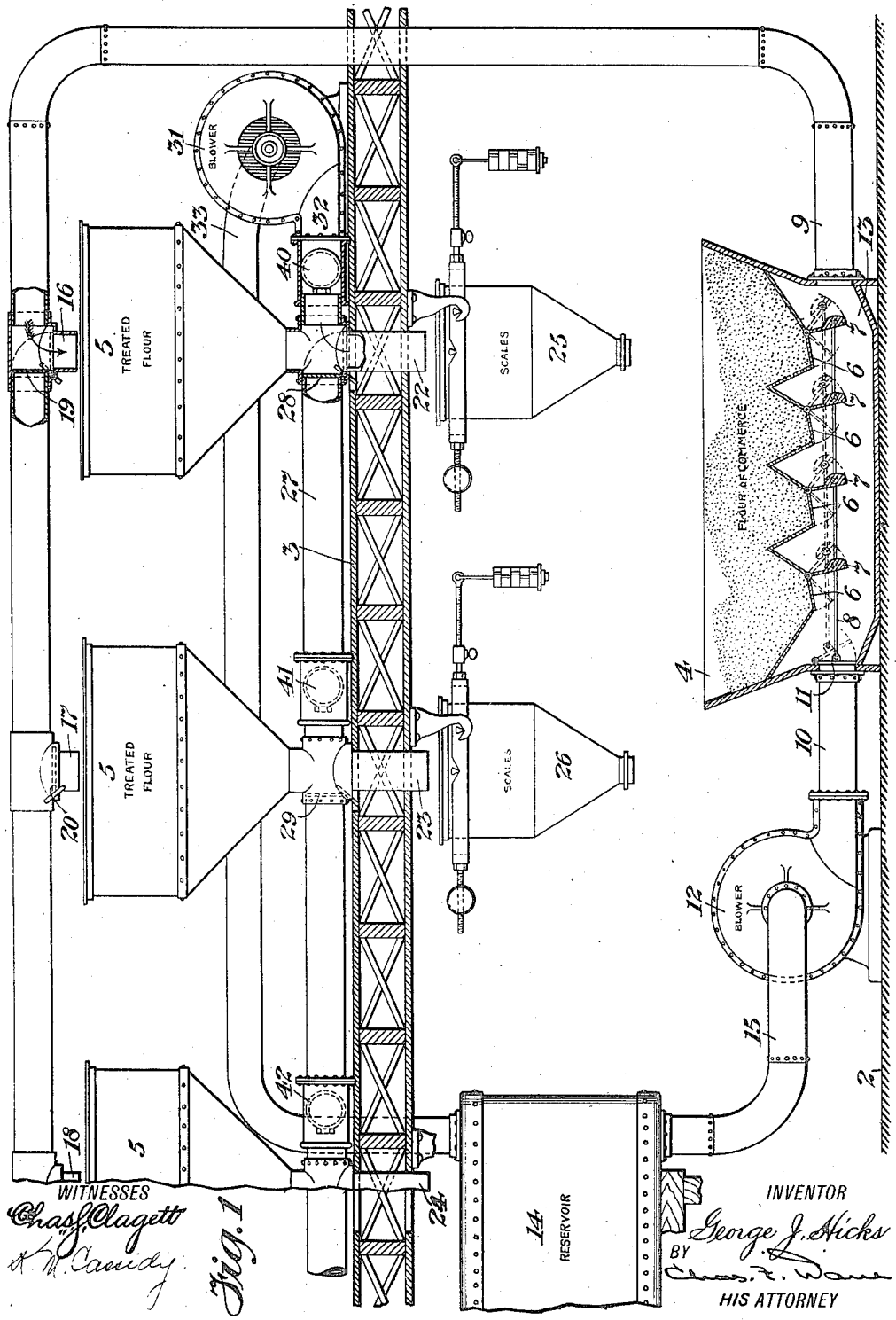

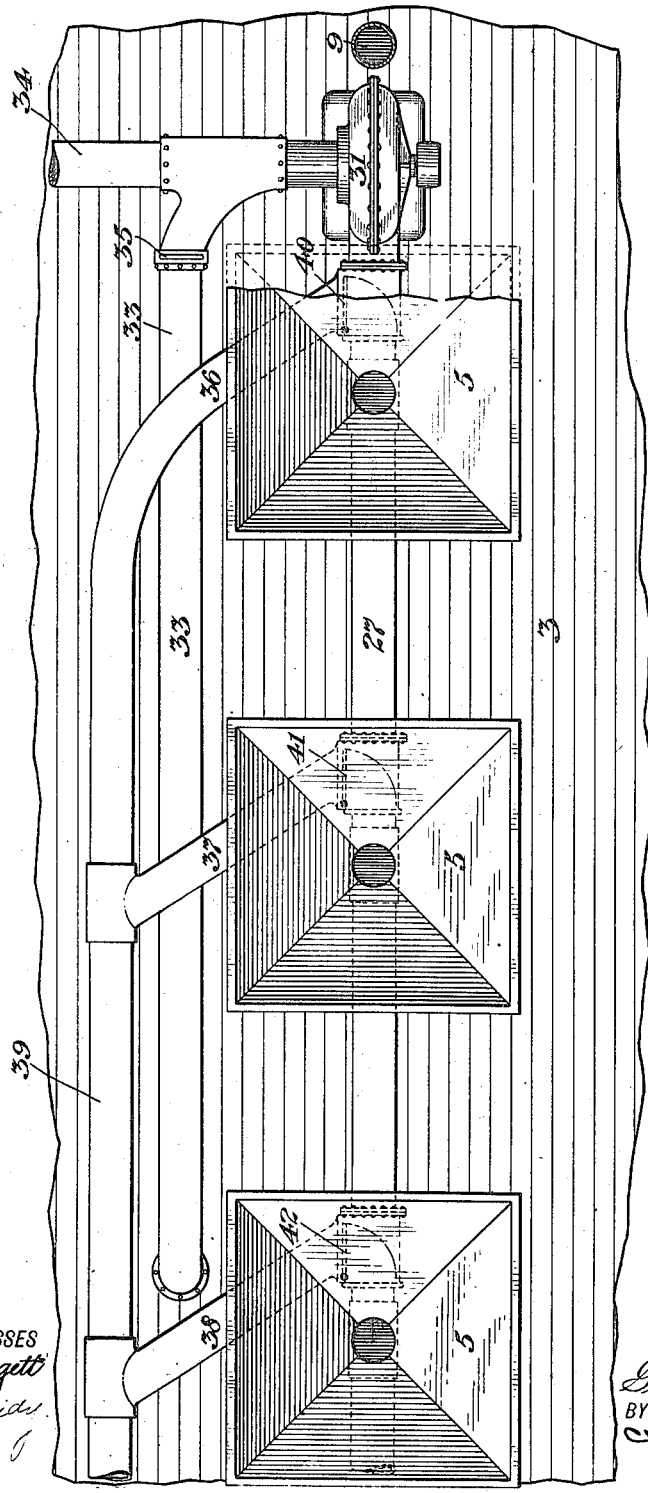

GEORGE J. HICKS, OF SAGINAW, MICHIGAN, ASSIGNOR TO RICHARD WERNER AND OTTO WERNER, BOTH OF CANNSTATT, PROVINCE OF WURTTEMBERG, GERMANY.

APPARATUS FOR TREATING FLOUR.

1,256,017.

Specification of Letters Patent.

Patented Feb. 12, 1918.

Application filed April 6, 1914. Serial No. 829,924.

*To all whom it may concern:*

Be it known that I, GEORGE J. HICKS, citizen of the United States, and resident of Saginaw, in the county of Saginaw and State of Michigan, have invented certain new and useful Improvements in Apparatus for Treating Flour, of which the following is a specification.

This invention relates to a method of and apparatus for treating flour to bring it into condition to be made up into dough, and the main object of the invention is to provide means for treating the flour in such a manner that it will be in the most favorable condition, as to temperature or moisture content, or both, for development into dough.

As is well known, flour is of various kinds, some containing much more moisture than others, particularly flour ground from new wheat during the summer months. Flours generally are stored in bakeries for a longer or shorter period of time before they are used in the manufacture of bread. During this period more or less evaporation takes place, according to the nature of the flour and other conditions. When so stored the flour may become either exceedingly hot or very cold, according to the season of the year and the location of the storage room. Flour of this kind is not in good condition to be made up into dough, and this is especially true if the flour is too warm. In recent years control of the temperature of the flour used in making dough has become a matter of much importance, owing to the fact that the machines used for mixing doughs have been operated at higher speeds than formerly and the resulting friction has increased the temperature of the dough being worked. When this temperature rises above a certain fixed point it is detrimental to the dough, as it has a tendency to soften the dough. High-speed mixing machines as now used have a tendency to heat up the dough from 20° to 50° F., according to the room temperature or the season of the year, and the higher the room temperature the greater is the percentage of increase of heat in a batch of dough during mixing. It has therefore become important to provide some means whereby dough after being properly mixed may be withdrawn from the mixer at the desired temperature. Should the flour be at as high a temperature as 75° F. it is difficult to obtain water cold enough to maintain the flour and water at a low temperature during a long period of mixing at high speed. In addition to this there is a further limitation due to the fact that if the water used is too cold the dough has a tendency to lie dormant during the fermentation period, the best temperature for fermentation being from 65° to 70° F.

There are many advantages connected with the production of cold doughs. One of the most important is that the loaves when baked are of better texture and color on the inside and are also of good size and "spring." In addition to this when the dough is cold it is dry and it has a tendency to appear drier than when it is a few degrees warmer. Thus, when the temperature of the materials used to make up a batch of bread is properly controlled, a more attractive loaf results. Moreover, when the dough is cold and dry and is run through a series of machines for performing the usual operations of mixing, kneading, and molding to the desired shape and size, very little lubrication in the form of flour dust is required to prevent the dough from adhering to the mechanism. Where the doughs are at a temperature of, say, 85° and upward they are soft and even though they have the same moisture content as a similar form of dough at a temperature of, say, 80° they will appear softer and require a considerable additional amount of flour for lubrication. This amount is about one per cent. of the weight of the dough. The effect of adding this extra flour is to form streaks or marks in the bread when baked, owing to this flour not being developed into dough by the moisture content of the batch, it being added in a dry state to the dough after the batch has been properly mixed. When dough containing a considerable percentage of dry flour is placed in an oven for baking the moisture in the dough begins to attack the dry flour, and this causes the gluten in this free flour to crack open with miniature explosion, which fracture the inside of the loaf more or less according to the amount of free flour present, the result being that the bread when baked is more or less full of holes due to these explosions.

The principal object of my present invention is to put the flour about to be mixed to form a dough into the best condition for producing the desired results. Where the flour is too dry or too moist moisture will be added or subtracted as desired to bring its moisture content to the proper point; and where the flour is too hot or too cold it will be correspondingly treated to bring it to the proper temperature. The necessary treatment of the flour to bring it to the proper condition involves its subjection to the action of pure air, or other suitable gaseous medium, at a temperature and of such humidity as to be in a condition for bringing the flour temperature and humidity to the desired point.

Other features of the invention not hereinbefore referred to will be hereinafter described and claimed and are illustrated in the accompanying drawings, in which—

Figure 1 is a sectional side elevation of an apparatus for treating flour in accordance with my present invention, and Fig. 2 is a plan of the upper portion of the same.

Similar reference characters designate like parts in all the figures of the drawings.

The drawings just described illustrate one embodiment of means that may be employed for treating flour in accordance with my process hereinbefore outlined. The apparatus illustrated is shown as located in part on one floor and in part on another floor of a building containing storage bins for ordinary flour, that is, the flour of commerce that has not been specially treated to regulate its temperature, moisture content, etc., and storage bins on another floor for receiving flour so treated. The storage bin for the untreated flour is here located on the lower floor 2, shown, and each storage bin for flour that has been treated is illustrated as located on the floor 3, at a higher level. The flour before treatment may be stored in any suitable manner, as in the large bin, 4, on the floor 2, and after treatment this flour may be transferred to a suitable receiving bin or bins, such as 5, on the upper floor 3. The manner in which flour is withdrawn from the bin 4, treated and then delivered to the upper bin or bins may be any coming within the scope of my invention as hereinbefore outlined. In the particular apparatus illustrated as an embodiment of mechanism comprising one feature of my invention, which mechanism is used for performing the operations constituting the other main feature of this invention, the lower bin 4 in which the flour of commerce is stored is intended to discharge its contents from the bottom of the bin, usually through a series of openings controlled by suitable closers, such as 6, which will normally be held closed, as by suitable counterweights, such as 7. Each of the closers 6 shown herein is pivoted at one edge so as to swing downward under the influence of the weight of the flour resting thereon, and this tendency to swing downward in opposition to the action of each counterweight is intended in this case to be assisted by the action of suitable means for treating the action of flour that falls in a stream through each of the openings in the bottom of said bin 4. In the construction shown all of the closers 6 of this bottom-discharge bin 4 are suitably connected for movement in unison, as for example, by means of a connecting-rod, 8, pivoted to each of the counterweighted arms 7 to move substantially as illustrated in Fig. 1.

Underneath the multiple-discharge openings of the storage bin 4, I have shown a chamber extending lengthwise of the bin and in communication at one end with a pipe, 9, leading to the receiving bins 5 for treated flour and at the other end with a pipe 10, leading to a suitable source of supply of the gaseous medium for acting upon the flour of commerce as it flows in one or more streams from the bottom of the bin 4. Here the outlet of the pipe 10 is shown as closed normally by a valve, 11, which is connected to the rod 8, and the other end of said pipe leads in this case directly to a fan or blower, 12, for forcing the gaseous treating medium through the pipe 10 and the space 13 beneath the storage bin 4 and through the discharge pipe 9. The blower is preferably supplied from a suitable reservoir, such as the tank 14, containing the gaseous medium at the desired temperature and humidity, this tank in the present case being intended to contain a supply of air at the proper temperature and containing the desired percentage of moisture, both the temperature and the moisture content being controlled by any suitable means (not shown). From the tank 14 this air is delivered through a pipe, 15, to the aforesaid blower 12 and is forced by said blower through the pipe 10 and operates to open the valve 11 in opposition to the action of the counterweights 7 transmitted through the connecting-rod 8. The extent to which the valve will be opened will depend upon the pressure of the air expelled from the pipe 10; and the effective area of each discharge opening at the bottom of the bin 4 will accordingly be dependent upon the pressure of the air forced through the pipe 10. This pressure will be sufficient in all cases, when flour is to be treated, to swing the closers 6 open in opposition to the action of their counterweights, and said closers will be held open so long as the proper pressure in the pipe 10 is maintained by the blower. Moreover, the size of the descending stream of flour flowing out of each discharge opening will depend upon how far the valve 11 is opened, which, as stated, is dependent upon the pressure at the outlet end of the pipe 10.

As the flour of commerce descends in a stream through each opening in the bottom of the bin 4, it is caught up by the stream of air discharged from the pipe 10 and whirled through the space 13 and then through the discharge pipe 9 in a finely divided condition. As soon as the stream of air strikes the stream of flour each particle exposed thereto is of course aerated and its temperature altered more or less and also its moisture content, the action of the air upon the particles of the stream continuing until all of the flour carried forward by the current of air is substantially at the temperature and humidity of the stream of air itself.

The flour thus treated, that is to say, aerated and its temperature and moisture content altered to the desired extent, is usually delivered into one or more bins or hoppers such as 5, as through openings, 16, 17 and 18, controlled by valves, such as 19, 20, etc. When the first of the receiving bins 5 is to be filled by the flour passing through the pipe 9 the valve 19 will be closed, as shown in Fig. 1. When the second bin 5 is to be filled the valve 19 will be opened and the valve 20 closed. In a similar manner a succeeding bin or bins of a series may be filled.

One feature of my invention, as before stated, is the provision of means for delivering treated flour to, and then immediately from a receiving bin. In carrying out this feature of my present invention each of the receiving bins 5 is preferably constructed so as to discharge from the bottom, as through the short vertical pipes, 22, 23 and 24, these preferably discharging into suitable weighing scales, such as 25, 26, etc., by means of which the quantities of flour used may be exactly determined. The construction illustrated is one in which the treated flour passing through the pipe 9 and delivered into the first receiving bin 5, for example, may be blown or discharged immediately through the discharge pipe 22 into the weighing scale, 25, as soon as the flour is treated. To do this the discharge pipe 22 should be isolated at such time from certain other elements of the system. Here all of said discharge pipes 22, 23, etc., are shown as connected to a common pipe, 27, the function of which will be hereinafter described; and suitable valves, such as 28, 29, etc., are placed in this pipe and operated in a manner similar to the valves 19, 20, etc., to cut off each discharge pipe 22, etc., from communication with the pipe 27 when desired. Thus in the normal operation of the apparatus the treated flour will be blown directly through the selected receiving bin 5 and through its discharge pipe into the corresponding weighing scale, from which it will be taken immediately for use.

When however the treated flour is not immediately used but is discharged into one or more of the bins 5 for treated flour, and is left there for any considerable period of time, it becomes necessary or at least desirable to subject such treated flour to a supplemental treatment, which may be of the same general character as that before described, before withdrawing such flour from the receiving bin. The object of this is to restore the treated flour substantially to the condition it was in immediately after treatment at the storage bin 4, the temperature and moisture content of the treated flour when stored in a bin 5 for any considerable length of time being affected considerably and the flour being considerably condensed or compacted, and not in the best condition for use. When in such condition it is important to subject it to further treatment to aerate and "fluff" the flour before using it, and to do this I may make use of means similar to that before described in connection with the main treatment. Here I have shown a second blower at 31, connected by a pipe, 32, to the receiving end of the pipe 27 before described, this blower being in connection with any suitable source of supply of the gaseous medium, such as air at the desired temperature and humidity, which is to be used to bring back the previously treated flour to the proper condition. This blower may receive its supply from the same source as the blower 12 through a pipe, such as 33, or it may take its supply from some other source, through a branch pipe, such as 34, leading into the pipe 33, the opening at the junction of the pipes being controlled in any suitable manner, as by a valve, 35. When this blower 31 is operated the air or other gaseous medium at the proper temperature and humidity will be forced through the pipe 27 and through any one of the short discharge pipes, 22, etc., according to the position of the valves 28, 29, etc., and will break up the descending stream of flour flowing through such short pipes and will agitate and aerate it and alter its temperature and humidity, substantially as before described, before the flour is discharged into the weighing scale.

At 36, 37 and 38 I have illustrated a series of branch pipes connected with the pipe 27 and leading into a common outlet or exhaust-pipe, 39, through which air from the blower may be exhausted when open to communication with said blower. Such communication is shown as controlled by valves 40, 41 and 42, at the inlet ends of the branch pipes 36, 37 and 38 respectively, communication to said respective branch pipes being open, as will be obvious, when said valves close communication with the pipe 27, and being closed when communication with the pipe 27 is opened by said valves. Of course each of these valves is opened or closed independently of the others, like the valves 28, 29, etc., and the valves 19, 20, etc., as will be obvious. The valves 40, etc., control, however, only the discharge of air and the course taken by it, while the valves 28, etc., and the valves 19, etc., control not only the course of the air, but also, and primarily, the course of the treated flour.

While I have referred herein only to flour as the material to be treated, I wish it to be understood that the invention is not intended to be limited in its use to the treatment of any one material, but on the contrary, may be used for the treatment of any material requiring treatment of the general character herein described.

What I claim is:—

1. In an apparatus for treating flour, the combination with a bottom-discharge storage bin having a plurality of separate discharge outlets provided with closers, of an air tank, means for holding open all of said closers, and a blower for forcing air from said tank through flour flowing from the discharge outlets of said bin.

2. In an apparatus for treating flour, the combination with a bottom-discharge storage bin having a plurality of separate discharge outlets provided with closers, means for holding open all of said closers, and a blower for forcing air through flour blowing from the discharge outlets of said bin.

3. In an apparatus for treating flour, the combination with a bottom-discharge storage-bin having a movable closer, of an air-tank, a blower for forcing a current of air from said tank through flour flowing from said bin, and means operated by said air current for opening said closer.

4. In an apparatus for treating flour, the combination with a bottom-discharge storage-bin having a pivoted closer, of an air-tank, a blower for forcing a current of air from said tank through flour flowing from said bin, and means operated by said air current for swinging said closer to its open position.

5. In an apparatus for treating flour, the combination with a storage-bin having a pivoted counterweighted closer, of an air-tank, a blower for forcing a current of air from said tank through flour flowing from said bin, and means operated by said air current for holding said closer open in opposition to said counterweight.

6. In an apparatus for treating flour, the combination with a storage-bin having a pivoted counterweighted closer, of an air-tank, a blower for forcing a current of air from said tank through flour flowing from said bin, and means operated by said air current for holding said closer open in opposition to said counterweight in a position corresponding substantially to the pressure of said air.

7. In an apparatus for treating flour, the combination with a bottom-discharge multiple-closer storage-bin for flour, of an air-tank, a blower for forcing air from said tank through flour flowing from said bin, and means operated by said air current for holding all of said closers open.

8. In an apparatus for treating flour, the combination with a pair of bins one being a bottom-discharge bin for holding untreated flour and the other being designed for receiving treated flour, of a pipe leading from the first to the second of said bins, means for forcing a current of air through flour as it is discharged by said first bin and blowing said flour through said pipe into said second bin, and means for supplying air of predetermined temperature and humidity to said last mentioned means.

9. In an apparatus for treating flour, the combination with a pair of bins one for holding untreated flour and the other for receiving treated flour, of a pipe leading from the first to the second of said bins, an air-tank containing air of predetermined temperature and humidity, and a blower for forcing a current of air from said air-tank through a stream of flour flowing from said first bin, blowing said flour through said pipe into said second bin and means for supplying air of predetermined temperature and humidity to said last mentioned means.

10. In an apparatus for treating flour, the combination with a bin for holding untreated flour and with a plurality of bins for receiving treated flour, of a pipe leading from said first bin to each of the other bins, valves for opening and closing communication between said pipe and the receiving bins selectively, and means for forcing a current of air through flour descending from the first bin and blowing said flour through said pipe into any one of said receiving bins.

11. In an apparatus for treating flour, the combination with a pair of bins one for holding untreated flour and the other for receiving treated flour, of a pipe leading from the first to the second of said bins, means for aerating flour at said first bin and blowing said flour through said pipe into said second bin, and means for aerating the flour as it is discharged from said second bin.

12. In an apparatus for treating flour, the combination with a pair of bins one for holding untreated flour and the other for receiving treated flour and each having a discharge opening, of a pipe leading from the first to the second of said bins, means for aerating flour at said first bin and blowing said flour through said pipe into said second bin, and means for aerating the flour as it is discharged from said second bin.

13. In an apparatus for treating flour, the combination with a pair of bins one for holding untreated flour and the other for receiving treated flour, of a pipe leading from the first to the second of said bins, means for aerating flour at said first bin and blowing said flour through said pipe into said second bin, and supplemental means for aerating flour at said second bin to bring it to predetermined temperature and moisture conditions.

14. In an apparatus for treating flour, the combination with a pair of bins each having a discharge-opening, of a pipe leading from the first to the second of said bins, means for aerating flour flowing from said first bin and blowing said flour through said pipe into said second bin, and supplemental means for aerating flour as it flows from said second bin.

15. In an apparatus for treating flour, the combination with a pair of bins one for holding untreated flour and the other for receiving treated flour, of a pipe leading from the first to the second of said bins, an air-tank containing air of predetermined temperature and humidity, means for forcing air from said air-tank through flour at said first bin and blowing said flour through said pipe into said second bin, and supplemental means for forcing air from the same air-tank through flour as it descends from said second bin.

16. In an apparatus for treating flour, the combination with a pair of bins each having a discharge-opening, of a pipe leading from the first to the second of said bins, means for subjecting flour flowing from said first bin to the action of air of predetermined temperature and humidity and blowing said flour through said pipe into said second bin, and means for subjecting flour as it flows from said second bin to the action of air of predetermined temperature and humidity.

17. In an apparatus for treating flour, the combination with a bottom-discharge storage bin having a movable closer, of a blower for forcing a current of air through flour flowing from said bin, and means operated by said air current for opening said closer.

Signed at Saginaw, in the county of Saginaw, and State of Michigan, this 30th day of March, A. D. 1914.

GEORGE J. HICKS.

Witnesses:
E. WELZEL,
E. C. BLACKWELL.